(12) United States Patent
Timm et al.

(10) Patent No.: US 6,522,730 B1
(45) Date of Patent: Feb. 18, 2003

(54) DSL COMMUNICATION SYSTEM WITH IMPROVED BANDWIDTH

(75) Inventors: William C. Timm, McKinney, TX (US); Terence J. Riley, Rockwall, TX (US); Michael O. Polley, Garland, TX (US); Gregory L. Waters, Bethlehem, PA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/232,305

(22) Filed: Jan. 15, 1999

(51) Int. Cl.[7] ............................................... H04M 11/00
(52) U.S. Cl. ................... 379/93.08; 379/93.31
(58) Field of Search ...................... 379/93.28, 93.31, 379/93.33, 93.34, 93.08, 93.05; 375/222; 370/282, 286, 287

(56) References Cited

U.S. PATENT DOCUMENTS 6,061,392 A * 5/2000 Bremer et al. ............... 375/222
6,151,335 A * 11/2000 Ko et al. ..................... 370/487
6,269,154 B1 * 7/2001 Chellali et al. .......... 379/93.28

* cited by examiner

*Primary Examiner*—Stella Woo
(74) *Attorney, Agent, or Firm*—Pedro P. Hernandez; W. James Brady III; Frederick J. Telecky, Jr.

(57) ABSTRACT

A telecommunications system using DSL modems (36, 38) detects on-hook or off-hook states of a local loop telecommunications line (18). If the local loop (18) is in an off-hook state, the normal data communication rates are used. If the local loop is in an on-hook state, the unused voice band is allocated to either the upstream band and/or downstream band of the DSL modems, in order to increase data communication rates.

22 Claims, 3 Drawing Sheets

DSL COMMUNICATION SYSTEM WITH IMPROVED BANDWIDTH

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to telecommunications and, more particularly, to a digital subscriber line (DSL) communications system.

2. Description of the Related Art

Data communications systems are playing an increasingly important role in society. The Internet, in particular, plays a significant role in business, education and leisure for many people, and this role is expected to expand dramatically over the next few years.

The vast majority of connections to the Internet use telephone lines and analog modems to communicate information. For many years, analog modems have been increasing in speed—over the last fifteen years, analog modem speeds have increased from 300 bps (bits per second) to 56 kbps (kilobits per second). 56 K modems receive data at 56 kbps (actually at 53 kbps due to telephone company specifications), but transmit data at 28.8 or 33.6 kbps.

Nevertheless, the speed increases in analog modems have been insufficient to meet the demands of users. While modems originally were used mainly to transmit text and small binary files, they are now used to transfer graphics, sound, animation and video. For telecommuting purposes, users often need to transfer large data files, as well.

Accordingly, users have been demanding greater modem speeds. An exciting prospect in providing greater bandwidth is the advent of DSL (digital subscriber line) modems. A DSL modem is one which can use existing telephone lines between the user and the telephone company's CO (central office) to transmit data at high frequencies rather than the low frequencies used by analog modems. There are a number of DSL specifications, including ADSL (Asymmetric Digital Subscriber Line), ADSL-Lite, R-ADSL (Rate Adaptive Digital Subscriber Line), HDSL (High Speed Digital Subscriber Line), SDSL (Symmetrical Digital Subscriber Line), and VDSL (Very High Speed Digital Subscriber Line), which are referred to collectively as DSL technologies.

An ADSL modem at customer premises has the capability to receive data at 1.5–8 Mbps (megabits per second) and to transmit data at 1.544 Mbps (assuming a local loop of 12,000 feet or less for the fastest speeds). This is a significant improvement over analog modems and over other technologies such as ISDN (Integrated Services Digital Network). Unlike cable modems, which can reach similar or higher speeds, the bandwidth is dedicated to each user (cable modems share the bandwidth of the cable, the available bandwidth depends upon the number of users of the cable at a given time).

Another advantage of DSL modems is that they can be used simultaneously with a voice connection. Analog telecommunications devices, such as phones, faxes and analog modems, use the frequency spectrum between 0 and 3.4 kHz (the voice band). Many DSL technologies use a frequency spectrum above the voice band for data communication. Splitters use a low pass filter to direct the voice band frequencies to the analog telecommunication devices and use a high pass filter to direct the data band frequencies to the DSL device.

However impressive the DSL speeds are in comparison with analog modems, the near future will demand even greater speeds, as more workers telecommute and more multimedia content is available on the Internet or other global network. Therefore, a need has arisen for DSL modems which provide higher speeds, while maintaining compatibility with analog telecommunications devices.

BRIEF SUMMARY OF THE INVENTION

In the present invention, a DSL telecommunications system includes a telecommunications line, a first DSL modem coupled to the line operable to communicate data over either a first or second frequency spectrum, and a second DSL modem coupled to the telecommunications line. The second DSL modem comprises detection circuitry to detect an on-hook or off-hook state of the telecommunications line and communications circuitry to communicate with the first DSL modem over the first frequency spectrum if the detection circuitry detects a on-hook state and to communicate with the first DSL modem over a second frequency spectrum if the detection circuitry detects an off-hook state.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–8 of the drawings, like numerals being used for like elements of the various drawings.

Figure 1:
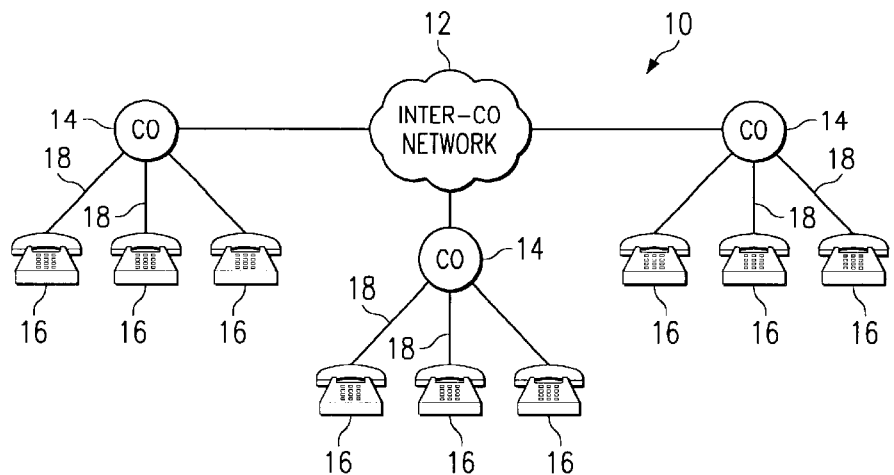
FIG. 1 illustrates a simplified block diagram of the public switched telephone network (PSTN)

FIG. 1 illustrates a simplified topology of the PSTN (public switched telephone network) 10. An inter-CO network 12 provides connections between various COs 14. The inter-CO network 12 uses high capacity fiber optic technology for fast, economical transfer of information between COs 14. The COs 14 are coupled to analog telecommunications devices, such as telephones 16 through local loops 18. Local loops 18 are typically twisted pair copper wire.

For analog telecommunications devices 16, the local loops carry information on the frequency spectrum between 0 and 3.4 kHz, although the twisted pair local loops 18 are capable of much higher frequency transmissions. A tremendous amount of capital has been used in building the local loop infrastructure, which reaches almost every home and business. DSL technology makes use of the available high frequency band of the local loops to transmit data at extremely high speeds.

Figure 2:
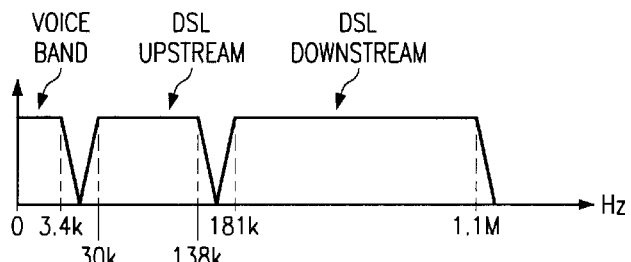
FIG. 2 illustrates a diagram showing frequency band spectrum for a prior art DSL implementation.

FIG. 2 illustrates a typical spectrum allocation for a DSL modem which allows simultaneous voice band connections along with data transmission. The voice transmission between the analog telecommunications device 16 and the CO 14 uses the frequency band between 0 and 3.4 kHz. The DSL upstream band (over which data is transmitted to the CO 14) uses the frequency spectrum between 30 kHz and 138 kHz. The DSL downstream band uses the frequency spectrum between 181 kHz and 1.1 MHz. It should be noted that these frequency spectrums are presented as an example; different DSL technologies allocate the spectrum differently. Further, echo cancellation can be used such that the DSL upstream band and downstream band overlap, as is well known in the art. Echo cancellation does not, however, allow the voice band to overlap the upstream band or downstream band.

Figure 3:
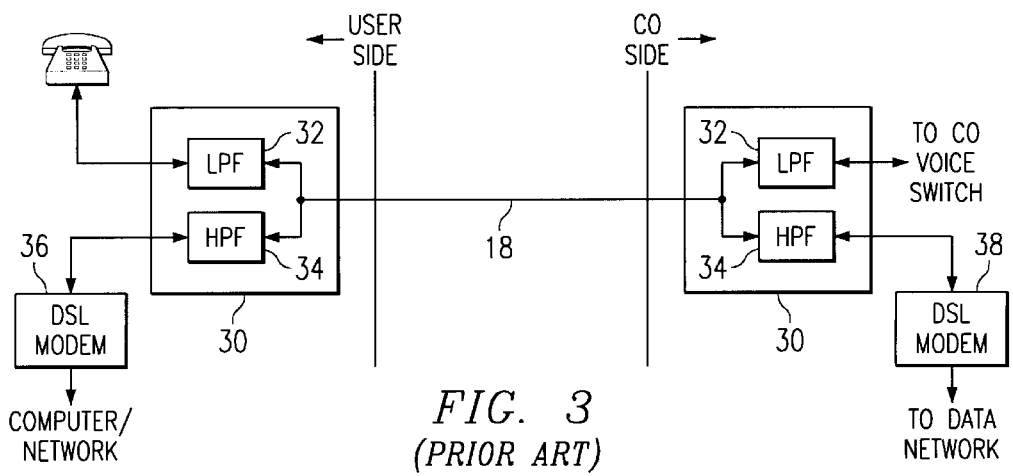
FIG. 3 illustrates a prior art DSL implementation between a user DSL modem and a central office DSL modem.

In order to separate the voice band from the DSL bands, splitters are used, as is shown in FIG. 3. The splitters 30 use a low pass filter (LPF) 32 to pass voice band frequencies to and from the analog telecommunications devices 16 operating in the voice band (on the user side of the local loop 18) and the CO (on the CO side of the local loop) and use a high pass filter (HPF) 34 to pass the upstream and downstream frequencies to and from the DSL modems 36 and 38 on the user and CO sides of the local loop, respectively. It should be noted that there are several configurations for splitting the voice and data signals. In one configuration, a splitter is used to pass the voice band to the existing wiring and the data bands to a dedicated line for a DSL modem. This structure works well, but is typically not user installable. Another configuration maintains the existing wiring intact and each device connected to the wiring has an associated filter. A low pass filter can be connected between each analog telecommunications device and the wall jack and a high pass filter can be connected between the DSL modem and the wall jack such that neither device affects the frequency band associated with the other. Some modems have internal high pass filters.

The configuration set out in FIGS. 2 and 3 provides significant advantages over standard analog telecommunications modems. First, the voice band used for standard analog communications devices, such as telephones and faxes, is not affected by data communications between the DSL modems and, therefore, voice and data communications can occur simultaneously over a single physical connection (i.e., the local loop 18). Second, the data connection is permanent (i.e., no dial up is necessary for connection to an Internet Service Provider).

In order to effect higher data rates, however, several DSL implementations (such s HDSL) use the entire frequency spectrum, including the voice band. Part of this incompatibility is due to digital modulation technologies such as 2-Binary/1-Quanternary (2B1Q) and Pulse-Amplitude-Modulation (PAM) that interfere with the voice band frequencies. In order to use these DSL technologies along with analog communication devices, it is necessary to have two physical connections, one for the analog telecommunications devices and one for the DSL modem. While providing high data rates, these DSL implementations do not take full advantage of the entire frequency spectrum like 2B1Q and PAM do.

Figure 4:
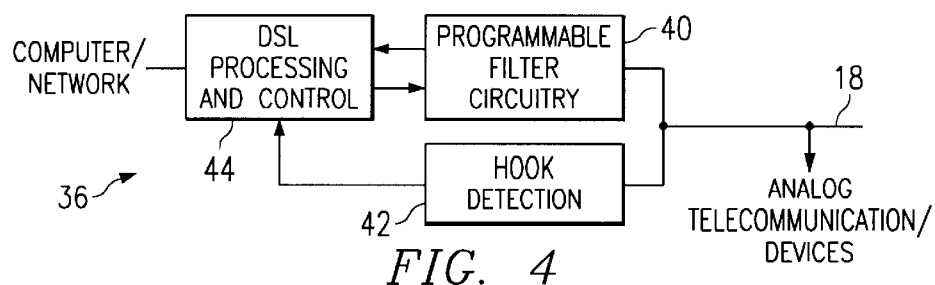
FIG. 4 illustrates a block diagram of a user DSL modem with enhanced speeds and voice band compatibility.
Figure 5:
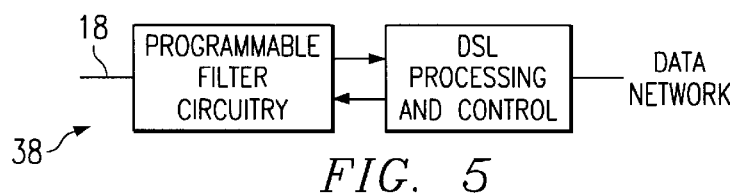
FIG. 5 illustrates a block diagram of a central office DSL modem with enhanced speeds and voice band compatibility.
Figure 6A:
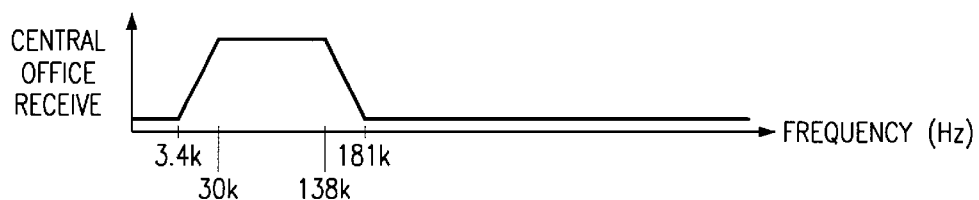
FIG. 6 illustrates a diagram showing example filter points for user and central office DSL modems when the local loop is in an off-hook state.
Figure 6B:
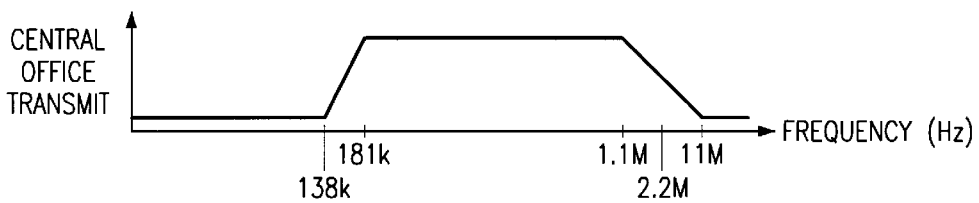
Figure 6C:
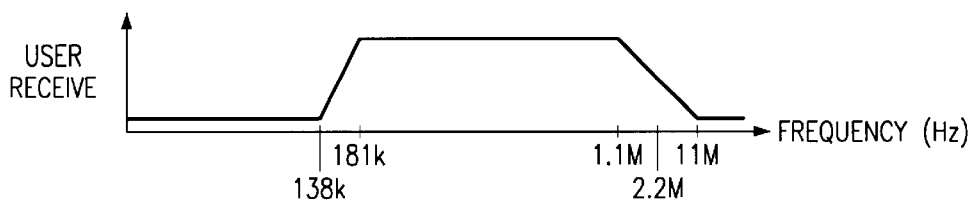
Figure 6D:
Figure 7A:
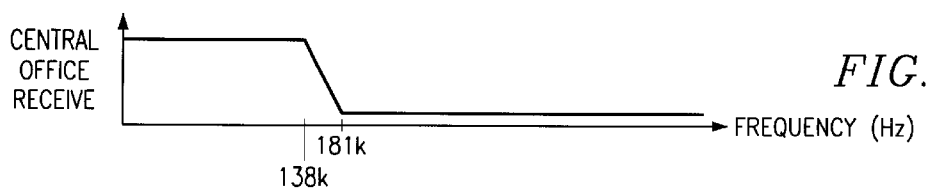
FIG. 7 illustrates a diagram showing a first example of filter points for the user and central office DSL modems of FIGS. 4 and 5, respectively, when the local loop is in an on-hook state.
Figure 7B:
Figure 7C:
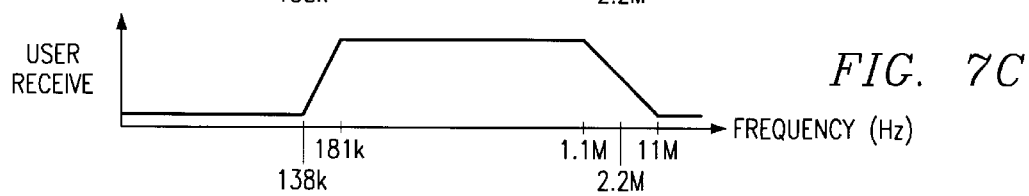
Figure 7D:
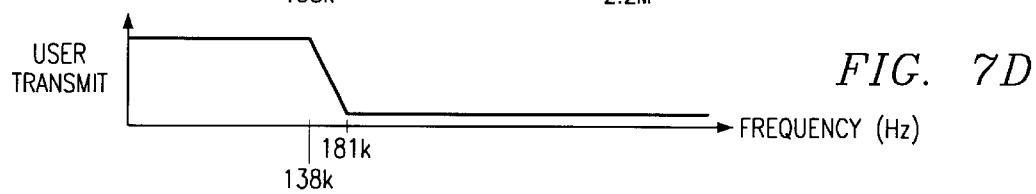
Figure 8A:
FIG. 8 illustrates a diagram showing a second example of filter points for the user and central office DSL modems of FIGS. 4 and 5, respectively, when the local loop is in an on-hook state.
Figure 8B:
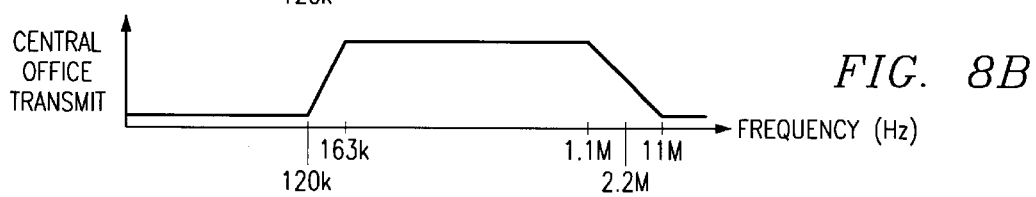
Figure 8C:
Figure 8D:

FIGS. 4 and 5 illustrate implementations of DSL modems for the user and CO sides, respectively, which provide for simultaneous voice and data communications, while providing for full bandwidth data communications when the voice band is not being used. In FIG. 4, a block diagram of a user side DSL modem 36 is shown. The local loop 18 is connected to the DSL modem 36, typically though the internal building wiring. The local loop 18 will also be connected to one or more analog telecommunications devices 16 via a splitter or low pass filter to isolate the voice band signals. The DSL modem 36 includes programmable filter circuitry 40 and hook detection circuitry 42 coupled to the local loop 18. Programmable filter circuitry 40 and hook detection circuitry 42 are coupled to DSL Processing and Control circuitry 44. DSL Processing and Control circuitry 44 is coupled to a computer or network on the user side.

In operation, hook detection circuitry 42 determines whether one or more of the analog telecommunications devices 16 coupled to the local loop 18 are in an off-hook state (i.e., being used). If so, a corresponding signal is output from the hook detection circuitry 42 to the DSL Processing and Control circuitry 44. The signal could be a simple binary status signal, such as a binary "0" which is stored in one bit of a control register, for example. On the other hand, if all the analog telecommunications devices 16 are in an on-hook state (i.e., not being used), a different signal is provided to the DSL Processing and Control circuitry 44 by the hook detection circuitry 42. For example, a binary "1" could be used to represent an on-hook state.

The local loop is in an on-hook state when all analog telecommunications devices 16 coupled to the loop are on-hook and is in an off-hook state when any analog telecommunications devices 16 coupled to the local loop is off-hook. Hook detection circuitry can detect whether any analog telecommunications devices 16 are off-hook through the impedance between the "tip" and "ring" lines of the local loop. When an analog telecommunications devices 16 is on-hook, only the telephone ringer is across the tip and ring lines. The impedance of the ringer is such that the voltage drop across the tip and ring lines is between forty-five and forty eight volts. When the telephone is off-hook, the impedance of the microphone and handset is substituted for the impedance of the ringer and the voltage across the tip and ring lines drops to approximately one to eight volts. The change of impedance (or voltage) across the tip and ring lines can easily be detected.

When the hook detection circuitry 42 indicates that the local loop is in an on-hook state, the voice band frequencies are not being used by any device. During these periods, the DSL modem 36 can take advantage of the additional bandwidth by using the voice band frequencies for data communications. Since attenuation is a function of distance and frequency, the voice band frequencies are the least attenuated, and therefore the most efficient at data transfer. It is estimated that addition of the voice band frequencies to the data communications bands can result in a speed increase on the order of 300 kbps which can be allocated between the upstream and downstream data streams.

To implement the full spectrum communications in response to a on-hook status signal from the hook detection circuitry 42, the programmable filter circuitry must be notified, such that the filters on the transmitted and received signals are adjusted to accommodate the new upstream and downstream data bands. Further, the CO-side DSL modem 38 must be notified so that it is aware of the change in the frequency spectrums associated with the upstream and downstream bands.

The signaling protocols used for the analog POTS (plain old telephone service) will likely cause large low-frequency interference that the system must be prepared to handle. The hook detection circuitry can be modified to recognize the forms of interference and notify the DSL Processing and Control circuitry 44 that the interference which occurred is likely to have caused errors in the current received data. The DSL Processing and Control circuitry 44 can then implement a request for retransmission to the CO DSL Processing and Control module, which can resend the information that was lost. However, if the user-side DSL modem 36 detects ringing pulses, it is likely that some of the analog POTS equipment will go to the off-hook state in response to the ringing signal so the modems can prepare to transition to the state where the home equipment is in the off-hook state.

FIG. 5 illustrates a block diagram of a CO-side DSL modem 38. This modem is similar in design to the user-side DSL modem, with the exception that the hook detection circuitry is not needed (or is disabled). The DSL Processing and Control circuitry 44 of the CO-side DSL modem 38 communicates with the DSL Processing and Control circuitry 44 of the user-side modem 36 during operation over a control channel. This control channel is a feature used by all DSL modems which require communication between the two modems for operation. The user-side DSL modem 36 provides information to the CO-side of the current on/off-hook state of the user-side analog telecommunications devices 16. When a change in on/off-hook state occurs, the CO-side acknowledges the change and the two modems arbitrate the change in the data bands.

FIG. 6 illustrates frequency diagrams for a DSL modem pair working with the frequency bands shown in FIG. 2. Both the CO DSL modem 38 and the user DSL modem 36 have receive and transmit filters which correspond to the frequency bands being used for data communication. The CO receive filter has the same filter points as the user transmit filter (both correspond to the upstream data band) and the CO transmit filter has the same filter points as the user receive filter (both correspond to the downstream data band). The illustrated embodiment shows a configuration without echo cancellation; if echo cancellation were used the transmit and receive filters for both modems 36 and 38 would be overlapping. It should also be noted that the frequency bands shown in FIGS. 2 and 6 are provided as an example, and the frequency spectrums used in an actual implementation would depend upon the DSL technology being employed.

When one or more analog telecommunications devices 16 are in an off-hook state, i.e., when the voice band is being used for voice communications, both modems 36 and 38 would be in their default state shown in FIG. 6. The modems 36 and 38 would continue to communicate in this state until all of the analog telecommunications devices 16 coupled to the local loop 18 were placed in an on-hook state.

Once all the analog telecommunications devices 16 were in an on-hook state, the modems 36 and 38 could transition to a higher speed configuration by using the additional, unused, voice channel. This transition could be effected automatically by the modems 36 and 38 upon recognition of the on-hook condition. Alternatively, the user could be notified of the current state and the transition would take place after confirmation. When the voice band frequencies are being used for DSL transmission, the DSL signal can interact with the analog telecommunications device's impedance and potentially introduce distortion in the DSL signal, particularly at the ringer frequency of 20 Hz. In order to mitigate this effect, the programmable filter circuitry can be designed to avoid the very low part of the voice frequency band, with a cutoff frequency of, for example, 100 Hz. When an analog telecommunications devices 16 is placed in an off-hook state, the modems 36 and 38 could return to the lower speed communication rate, thus returning the voice band for voice communications.

FIG. 7 illustrates frequency diagrams for the transmit and receive filters of the CO modem 38 and user modem 36 in the high-speed state. In the embodiment shown in FIG. 7, the voice band frequencies are allocated to the upstream data band. Accordingly, the filter points for the CO transmit filter and the user receive filter remain unchanged. The CO receive filter and the user transmit filter however now pass all the frequencies between 0 and 30 kHz, providing a significant speed in upstream speed.

Typically, as shown in FIG. 2, the bandwidth for downstream communications is larger than that for upstream communications, because larger files are typically downloaded to a user, rather than uploaded. In some cases, such as VoIP (voice over internet protocol) and video conferencing, this may not be the case, and it would be preferable for the user to have the additional bandwidth illustrated in FIG. 6.

On the other hand, it may be desirable to add the bandwidth provided by the unused voice channel to the downstream band, or to allocate the additional bandwidth to both upstream and downstream channels. Such an allocation is shown in FIG. 8, where the filter points for the receive and transmit filters in both the user modem 36 and CO modem 38 have been changed.

Since a user may desire more upstream bandwidth in certain circumstances and more downstream bandwidth in other circumstances, it would be possible for the user to inform the user modem 36 which allocation of the voice band was desired by software control.

In the preferred embodiment, a DSP is used to implement the DSL functions described above. As described in U.S. Ser. No. 08/645,020, entitled "Multimode Digital Modem" to Timm et al, filed May 9, 1996, which is incorporated by reference herein, a single DSP can be used for the DSL functions and also to support analog voice channel data communications, i.e., a voice modem and/or facsimile. The voice channel data communications could operate simultaneously with the DSL functions (although the DSL communications would then be limited to the data band frequencies) or either function could be used separately.

The present invention can be used in conjunction with a number of DSL technologies and modulation techniques. Both CAP (carrierless amplitude-phase) modulation and DMT (discrete multitone) modulation, along with other modulation techniques, can use the additional bandwidth afforded by an unused voice band to increase data communications speeds. The aspect of modifying the data bands can be used with ADSL, SDSL, RADSL, ADSL-Lite and other DSL implementations.

While the present invention has been discussed in connection with applying a certain DSL implementation over a larger frequency spectrum when the local loop is in an on-hook state to obtain greater data communication speeds, it should be noted that the modems could communicate using two different techniques depending upon the state of the local loop 18. Thus, when the local loop 18 was in an off-hook state, a technique which did not require the voice band frequencies would be used; when the local loop was in an on-hook state, a second technique could be used, such as HDSL, which could not be implemented while using the voice band frequencies for analog communications. The switching between different DSL implementations or modulation schemes would require a significant amount of setup on both the user-side and CO-side modem 36 and 38.

While the hook detection circuitry is shown in the user-side modem, it could be alternatively implemented in the CO-side modem to detect off-hook conditions from the CO-side.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A DSL telecommunications system, comprising:
   a telecommunications line;
   a first DSL modem coupled to said telecommunications line operable to communicate data over either a first or second frequency spectrum;
   a second DSL modem coupled to said telecommunications line comprising:
      detection circuitry to detect whether said telecommunications line is in either an on-hook or an off-hook state;
      communications circuitry to communicate with said first DSL modem over said first frequency spectrum if said detection circuitry detects a on-hook state and to communicate with said first DSL modem over a second frequency spectrum if said detection circuitry detects an off-hook state, and the communications circuitry includes programmable filter circuitry.

2. The DSL telecommunications system of claim 1 wherein said detection circuitry comprises circuitry to determine the voltage between tip and ring lines of said telecommunications line.

3. The DSL telecommunications system of claim 1 wherein said detection circuitry comprises circuitry to determine the impedance between tip and ring lines of said telecommunications line.

4. The DSL telecommunications system of claim 1 wherein said second frequency spectrum excludes voice band frequencies.

5. The DSL telecommunications system of claim 4 wherein said first frequency spectrum includes voice band frequencies.

6. The DSL telecommunications system of claim 1 wherein said programmable filter circuitry sets receive and transmit filters defining the frequency ranges for receiving and sending data, respectively, responsive to the output of said detection circuitry.

7. The DSL telecommunications system of claim 1 wherein said first DSL modem includes communications circuitry to communicate with said second DSL modem over said first frequency spectrum if said detection circuitry detects a on-hook state and to communicate with said second DSL modem over a second frequency spectrum if said detection circuitry detects an off-hook state.

8. The DSL telecommunications system of claim 1 wherein said second DSL modem communicates the state of telecommunications line to said first DSL modem.

9. A method of communicating between DSL modems comprising the steps of:
   detecting whether a telecommunications line is in an on-hook or off-hook state;
   communicating between first and second DSL modems over said first frequency spectrum if said detection circuitry detects a on-hook state and communicating between first and second DSL modems over a second frequency spectrum if said detection circuitry detects an off-hook state, and the communicating step comprises the steps of setting the filter points of programmable filters in said first and second modems based on the state detected in said detecting step.

10. The method of claim 9 wherein said detecting step comprises the step of determining the voltage between tip and ring lines of said telecommunications line.

11. The method of claim 9 wherein said detecting step comprises the step of determining the impedance between tip and ring lines of said telecommunications line.

12. The method of claim 9 wherein said step of communicating over a second frequency spectrum comprises communicating over a frequency spectrum which excludes voice band frequencies.

13. The method of claim 9 wherein said step of communicating over a first frequency spectrum comprises communicating over a frequency spectrum which includes voice band frequencies.

14. The method of claim 9 wherein said first and second DSL modems exchange control information regarding the state of the telecommunications line.

15. A DSL modem, comprising:
   detection circuitry to detect whether a telecommunications line coupled to the modem is in either an on-hook or an off-hook state;
   communications circuitry to communicate data over said first frequency spectrum if said detection circuitry detects a on-hook state of said telecommunications line and to communicate data over a second frequency spectrum if said detection circuitry detects an off-hook state of said data communications line, and the communications circuitry includes programmable filter circuitry.

16. The DSL modem of claim 15 wherein said detection circuitry comprises circuitry to determine the voltage between tip and ring lines of said telecommunications line.

17. The DSL modem of claim 15 wherein said detection circuitry comprises circuitry to determine the impedance between tip and ring lines of said telecommunications line.

18. The DSL modem of claim 15 wherein said second frequency spectrum excludes voice band frequencies.

19. The DSL modem of claim 15 wherein said first frequency spectrum includes voice band frequencies.

20. The DSL modem of claim 15 wherein said programmable filter circuitry sets receive and transmit filters ranges defining the frequency ranges for receiving and transmitting data, respectively, responsive to the output of said detection circuitry.

21. The DSL modem of claim 15 and further comprising circuitry to communicate control signals to responsive to said detection circuitry.

22. A DSL telecommunications system as defined in claim 5, wherein said first and second DSL modems allocate the additional bandwidth of the first frequency spectrum to both upstream and downstream channels when the detection circuitry detects that the telecommunications line is in the on-hook state.

* * * * *